Sept. 7, 1926.
E. M. KERR
1,599,332
BEARING AND GEAR PULLING DEVICE
Filed May 2, 1925
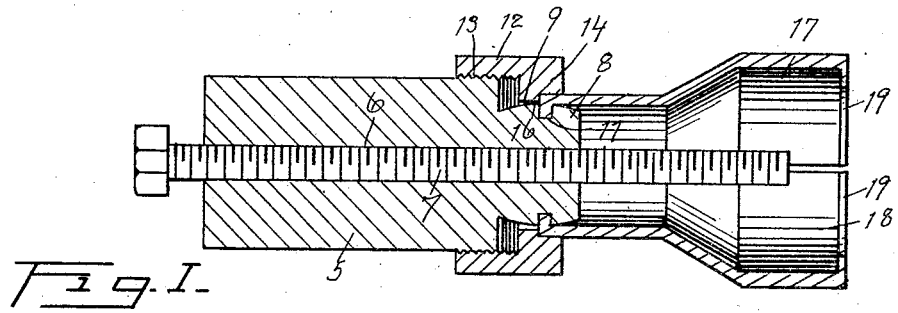
Fig. I.
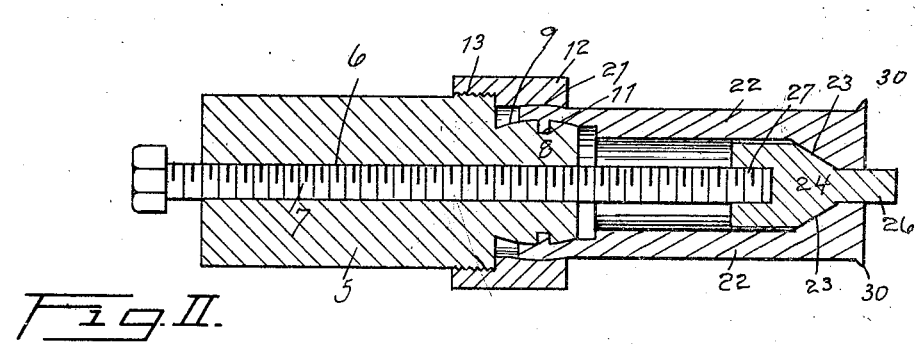
Fig. II.
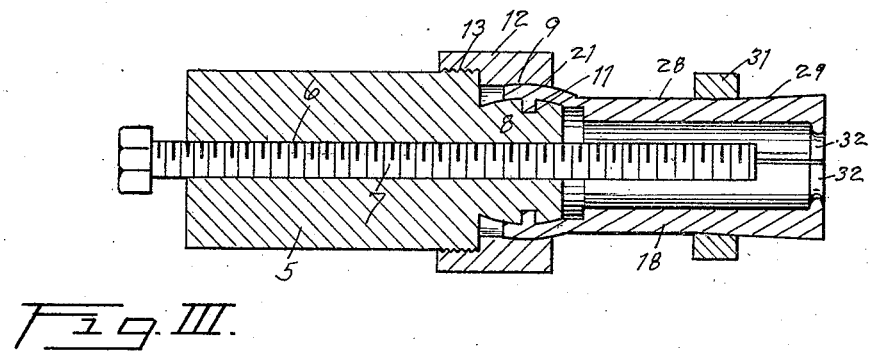
Fig. III.
INVENTOR.
EARL. M. KERR
BY Victor J. Evans
ATTORNEY

UNITED STATES PATENT OFFICE.

EARL MORTIMER KERR, OF WHITTIER, CALIFORNIA.

BEARING AND GEAR PULLING DEVICE.

Application filed May 2, 1925. Serial No. 27,555.

This invention relates to improvements in bearing and gear pulling devices.

The principal object of this invention is to produce a simple tool which may be employed for the pulling of gear and bearing members either on the inner race or outer race.

Another object is to produce a device of this character which is strong, and simple to operate.

An additional object of this invention is to produce a tool of this character which may be readily transported and one which will not mutilate the object being drawn.

Other objects and advantages will be apparent during the course of the following description.

In the accompanying drawings forming a part of this specification, and in which like numerals are employed to designate like parts throughout the same, Figure I is a horizontal cross section of one form of my device adapted to pull gears, Figure II is a similar view of a modified form of my device having jaws adapted to pull the outside race of a ball bearing, and Figure III is a similar view showing my device having jaws adapted to pull the inner race of a ball-bearing.

In automobile construction it is often necessary to remove small gears, such as are on magnetos which have been driven upon their shafts and may have become tight through corrosion. I have, therefore, found that by employing a device, such as illustrated in this application, I may draw these gears without mutilating the same and that by employing the same tool it is possible to draw the inner and outer races of a ball-bearing without mutilating them.

In the accompanying drawings wherein for the purpose of illustration is shown a preferred example of my invention, the numeral 5 designates a block having a bore 6 therethrough within which is positioned a screw 7. One end of this block has a reduced portion 8 having its surface formed upon an arc as shown at 9, and further provided with a groove 11 within which the bent ends of the removable jaws are positioned.

Referring to Figure I, it will be noted that a ring 12 is threadedly engaged as at 13 with the block 5. This ring has an inturned flange 14 which is provided with a lip 16. At 17 and 18 I have shown two jaws, each carrying an inturned flange 19. It is, of course, understood that there are four of these jaws in each set.

The construction illustrated in Figure II is similar to that just described, with the exception that the ring 12 is provided with an arcuate face 21, which engages the jaws 22. These jaws 22 are provided with an inclined face 23 adapted to contact the inclined face of a plug 24 having a tip 26 and a socket 27, which is adapted to fit over the end of the screw 7. Each of these jaws 22 is further provided with outwardly extending tapered edges 30, which are adapted to engage the outer race of a roller bearing.

The form shown in Figure III in construction is identical, with the exception that the jaws 28 are tapered as shown at 29 and adapted to receive a ring 31. These jaws are provided with an inturned flange as shown at 32.

The manner of operating my device is as follows:—

Assuming that the form shown in Figure I is being employed, the screw 7 is backed out of the block 5 a sufficient distance to permit the jaws 17 and 18 to be placed over a gear or like object, after which the ring 12 is screwed outwardly so that the lip 9 and inturned flange 14 will engage the ends of the jaws and prevent them from changing their adjusted position. By now screwing inwardly on the screw 7 pressure will be brought to bear on the end of the shaft carrying the gear, to be removed. As the screw moves, in forcing the jaws in the opposite direction the gear will be forcibly drawn from the shaft.

In the form shown in Figure II, the action is similar with the exception that the screw 7 is moved a sufficient distance to permit the plug 24 to assume the position shown in this figure, after which the jaws are inserted within the outer ball race in such a manner as to cause the tapered edge 30 to pass behind the race and as the screw 7 is again moved inwardly the inclined surface 23 will cause the jaws to move outwardly against the ball race.

By giving a slight blow with a hammer upon the block 5, or the tip 26, the ball race will be withdrawn from its position. In the form shown in Figure III the action is identical with the exception that the jaws engage the inner race commonly secured to the shaft and are prevented from spreading by the employment of a ring 31 which moves the inclined surface of the jaws 21. By causing the screw 7 to engage the end of the shaft on which the bearing is mounted, a removal of the same will be effected in an efficient manner.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, I claim:—

1. In a device of the character described, a block having a bore formed therein, a screw positioned within said bore, said block having a reduced end, said reduced end being formed upon an arc, a groove formed in said reduced end, a plurality of jaws having bent ends adapted to engage said groove, a ring threadedly secured on said block, an inturned flange formed on said ring, said flange engaging the outer surface of said jaws at a point adjacent their engagement with said groove, each of said jaws having a work engaging rim, and means for maintaining said work engaging rim in contact with the work to be executed.

2. In a device of the character described, a block having a bore formed therein, a screw positioned within said bore, said block having a reduced end, said reduced end being formed upon an arc, a groove formed in said reduced end, a plurality of jaws having bent ends adapted to engage said groove, a ring threadedly secured on said block, an inturned flange formed on said ring, said flange engaging the outer surface of said jaws at a point adjacent their engagement with said groove, each of said jaws having a work engaging rim, a plug adapted to be positioned between said jaws, said plug having an inclined surface, for the purpose of expanding said jaws when forced away from said block by said screw.

In testimony whereof I affix my signature.

EARL MORTIMER KERR.